April 13, 1937.  H. A. W. KLINKHAMER ET AL  2,077,114
WELDING APPARATUS
Filed March 4, 1936  3 Sheets-Sheet 1

INVENTORS
H. A. W. KLINKHAMER
C. A. LAMEERIS
N. A. J. VOORHOEVE and
P. H. DE JONG
BY
E. F. Wendroth
ATTORNEY April 13, 1937. H. A. W. KLINKHAMER ET AL 2,077,114
WELDING APPARATUS
Filed March 4, 1936 3 Sheets-Sheet 2

INVENTORS
H.A.W. KLINKHAMER
C.A. LAMBERTS
N.H.J. VOORHOEVE and
F.H. DE JONG
BY
ATTORNEY INVENTORS
H. A. W. KLINKHAMER
C. A. LAMBERTS
N. A. J. VOORHOEVE and
F. H. DE JONG
BY
ATTORNEY Patented Apr. 13, 1937

2,077,114

UNITED STATES PATENT OFFICE 2,077,114

WELDING APPARATUS

Hendrik Abraham Wijnand Klinkhamer, Clamor August Lamberts, Nicolaas Anthony Johannes Voorhoeve, and Frans Hendrik de Jong, Eindhoven, Netherlands, assignors to N. V. Philips' Gloeilampenfabrieken, Eindhoven, Netherlands Application March 4, 1936, Serial No. 67,170
In the Netherlands March 13, 1935

6 Claims. (Cl. 171—119)

Our invention relates to welding apparatus in which one or more rectifying tubes are used to produce D. C. welding current from an A. C. supply, and more particularly to welding apparatus for welding with both A. C. and D. C. current.

In such apparatus, the rectifying tubes are connected to the secondary winding of a transformer which steps-down the A. C. supply or network voltage to the comparatively low voltage suitable for welding. Because of the absence of rotating machinery, such as generators, such a D. C. welding apparatus has a low initial cost, is very easy to operate, and has particular advantages when used for welding small work-pieces, for example, comparatively thin plates or sheets. However, an apparatus of the above type designed for small welding currents, can not be used for large welding currents, due to the small overload capacity of the rectifying tubes. On the other hand, if the apparatus is designed for large welding currents, this involves not only a higher initial cost, but also a low efficiency when using the apparatus with small welding currents.

While it is known to provide single-phase welding apparatus with a change-over device whereby the welding may be effected either with A. C. or D. C. current, the known devices have the disadvantage that they are only adapted for a single phase supply and cannot deliver strong currents.

The object of our invention is to eliminate the above drawbacks and to provide a polyphase welding apparatus which is adapted to be changed-over in such a manner that the welding can be carried out with either A. C. or D. C. current in an efficient and effective manner as regards the load on the transformer and on the supply mains.

A further object of our invention is to provide a welding apparatus which may be efficiently used on two different supply voltages.

According to our invention the transformer is built up of a plurality of single-phase transformer portions, and switching means are provided for changing-over from D. C. to A. C. welding whereby the primary as well as the secondary windings or parts thereof are connected in parallel, and whereby the transformer is connected in single-phase and the A. C. welding current is taken directly from the secondary windings.

A very simple circuit arrangement, which is highly economical as regards the utilization of material, is obtained by building up the transformer from two single-phase transformer portions and by so connecting the windings that in D. C. welding, the three-phase supply current is transformed into symmetrical four-phase current by the use of the well-known Scott connection. It is generally desirable to provide upon the transformer one or more auxiliary windings and connect these windings in series with one of the other transformer windings when the apparatus supplies A. C. welding current.

The welding apparatus according to the invention is universal and gives optimum results when used for either A. C. or D. C. welding. With D. C. welding, small work-pieces, such as thin sheets, can be welded with all the inherent advantages of D. C. welding. On the other hand, during A. C. welding, the welding current is taken directly from the transformer windings in which case the transformer may be overloaded without damage, particularly for the short periods occurring in welding. This, together with the parallel connection of a number of windings, makes the apparatus particularly adapted for the A. C. welding of the larger work-pieces requiring a comparatively high current. As during A. C. welding the rectifying tubes are not in operation their life merely depends upon their use in D. C. welding, which is such as not to require their overloading, and which makes their replacement less frequent.

In order that our invention may be clearly understood and readily carried into effect it will be more fully described with reference to the accompanying drawings, in which.

Figure 1:
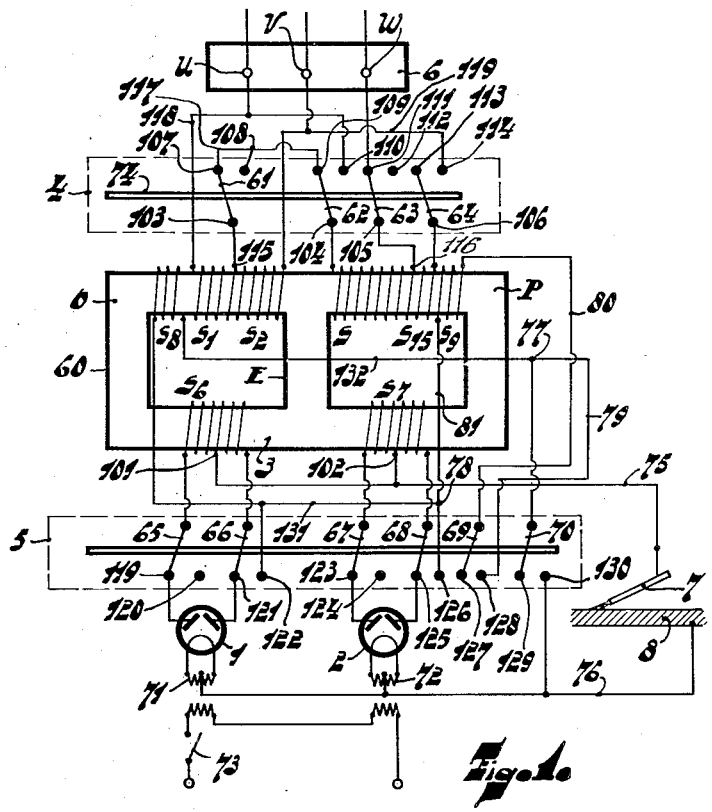
Figure 1 is a schematic diagram of a welding apparatus according to the invention.

Figure 1 shows a welding apparatus which supplies either D. C. or A. C. welding current from an A. C. supply connected to terminals U, V, and W, and comprises a transformer 60, two switches 4 and 5, two full-wave rectifying tubes 1 and 2, together with a welding electrode 7, and a work-piece 8.

The transformer 60 consists of two single-phase transformer portions O and P whose cores have a common yoke E. Provided on the transformer portion O are two primary windings $S_1$ and $S_2$ interconnected at 115, and a secondary winding $S_6$ having a central tap 101. The transformer portion P is provided with primary windings S and $S_{15}$ interconnected at 116, and a secondary winding $S_7$ having a central tap 102. Arranged on the cores of transformer portions O and P so as to be tightly coupled with the primary windings thereof, are two auxiliary windings $S_8$ and $S_9$.

The primary and secondary windings of each transformer portion are disposed on different portions or legs of the core in order to increase the leakage, however, the same effect may be obtained by using, between the primary and secondary windings, adjustable iron bridge pieces (not shown). The primary windings S, $S_1$ and $S_2$ are connected in accordance with the Scott arrangement.

The switches 4 and 5 are of the multipole double-throw type, and when in their left-hand position, as shown, make the required connections for supplying a D. C. welding current, whereas in their right-hand position make the connections for A. C. welding. The switches 4 and 5 are preferably interlocked so that they will both be in their right- or left-hand positions.

Switch 4 comprises a member 74 upon which are mounted insulated from each other four contact arms 61, 62, 63, and 64 having heel points 103, 104, 105, and 106 respectively. In the left-hand position of the switch, as shown, the arms 61, 62, 63, and 64 contact with contacts 107, 109, 111, and 113 respectively, whereas in the right-hand position they contact with contacts 108, 110, 112 and 114 respectively. The heel point 103 is connected to the point 115 between windings $S_1$ and $S_2$, heel point 105 is connected to the point 116 between windings S and $S_{15}$, whereas heel points 104 and 106 are connected to the free ends of windings S and $S_{15}$. Contact 107 is permanently connected through conductor 117 to contact point 109, contact 110 is connected through conductor 118 to the terminal U and to the free end of winding $S_1$, contact 111 is connected to terminal W, contact 114 is connected through a conductor 119 to the terminal V and to the free end of windings $S_2$. Contacts 108, 112, and 113 are not used.

Switch 5 is similar to switch 4 and has six arms 65, 66, 67, 68, 69 and 70, which in the left-hand position of the switch contact with contacts 119, 121, 123, 125, 127 and 129 respectively, whereas in the right-hand position of the switch they contact with contacts 120, 122, 124, 126, 128, and 130 respectively. The heel points of arms 65 and 66 are connected to the ends of secondary winding $S_6$, and the heel points of arms 67 and 68 are connected to the ends of secondary winding $S_7$. Contact points 119 and 121 are connected respectively to the two anodes of tube 1, whereas contacts 123 and 125 are connected respectively to the anodes of tube 2. Contact point 122 is connected through a conductor 131 to one end of winding $S_8$, whose other end is connected through conductor 132, at 77 to heel of arm 70, and through conductor 79 to contact point 128.

The conductor 131 is connected at point 78 to a conductor 81 connecting contact point 126 to one end of winding $S_9$ whose other end is connected through conductor 80 to the heel point of arm 69. The contact points 120, 124, 127, and 129 are not used.

The electrode 7 is connected through a conductor 75 to the taps 101 and 102 of the secondary windings $S_6$ and $S_7$, whereas the work-piece 8 is connected through a conductor 76 to the contact point 130 and to the midpoints of the secondary windings of heating transformers 71 and 72, which supply heating current to the cathodes of the tubes 1 and 2. The transformers 71 and 72 have their primary windings connected in series through a switch 73 to a suitable alternating current supply.

Instead of using separate heating transformers, the cathode heating current may be provided from windings located on the core of the transformer 60. Furthermore, the connections of the electrode 7 and work-piece 8 may be reversed.

With switches 4 and 5 in their left-hand position, as shown, the apparatus supplies D. C. welding current. Winding S has one end connected through contact arm 62, conductor 117, and arm 61 to point 115, whereas the free ends of windings $S_1$, $S_2$, and S are connected to the terminals U, V and W respectively. Windings $S_8$, $S_9$ and $S_{15}$ are not in use in D. C. welding.

Switch 5 being in its left-hand position the anodes of tubes 1 and 2 are connected through arms 65, 66, 67, and 68 to the ends of windings $S_6$ and $S_7$, and the D. C. welding current is supplied through conductors 75 and 76.

To place the apparatus in condition for A. C. welding, switches 4 and 5 are moved into their right-hand position. With switch 4 in its right-hand position, windings $S_1$ and $S_2$ are connected in series across the terminals U—V through a circuit including terminal U, conductor 118, windings $S_1$ and $S_2$ and conductor 119 to terminal V. Coils S and $S_{15}$ are also placed in series across terminals U—V through a circuit including terminal U, arm 62, coils S and $S_{15}$, arm 64 and conductor 119 to terminal V. The winding $S_{15}$ is given the proper number of turns whereby equal voltages are induced in the two parallel groups consisting of windings $S_1$ and $S_2$, and of S and $S_{15}$.

The secondary windings may be connected in parallel in various ways for A. C. welding; however, as in many types of welding the voltage-loss of the transformer may be too high, we reduce this by connecting the windings $S_8$ and $S_9$ in parallel with each other and in series with the parallel connection of the right-hand portion of windings $S_6$ and $S_7$. More particularly, with switch 5 in its right-hand position, the right-hand ends of windings $S_6$ and $S_7$ are connected through switch arms 66 and 68 and contacts 122 and 126 respectively, to the conductor 131. The circuit then passes through two parallel circuits including windings $S_8$ and $S_9$ respectively. One of these parallel circuits may be traced from conductor 131 through winding $S_8$, conductor 132 to point 77, whereas the other parallel circuit may be traced from point 78 on conductor 131, through conductor 81, winding $S_9$, conductor 80, switch arm 69, contact 128, and conductor 79 to point 77. The point 77 is connected through switch arm 70, contact 130 and conductor 76 to the work-piece 8; whereas the electrode 7 is connected through the conductor 75 to the midpoints 101 and 102 to complete the A. C. welding current circuit.

During A. C. welding the anodes of the tubes 1 and 2 are disconnected from the windings $S_6$ and $S_7$ by the arms 65, 66, 67 and 68, whereas the cathode heating current is interrupted by switch 73, which is preferably interlocked with switches 4 and 5.

Figure 2:
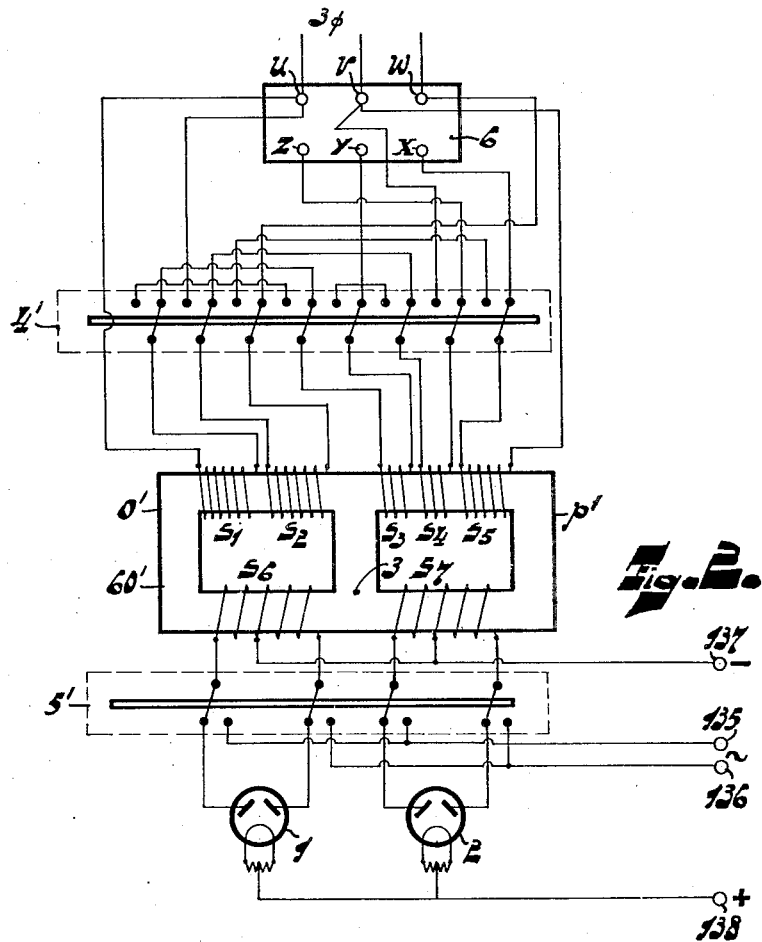
Fig. 2 is a schematic diagram of a welding apparatus according to another embodiment of the invention.

The welding apparatus shown in Fig. 2 comprises a transformer 60' adapted to be connected to a three-phase supply and consisting of two single-phase transformer portions O' and P' having a common yoke. The windings of the transformer portions O' and P' may be connected in accordance with the Scott connection so that a four-phase secondary voltage is obtained.

In order that the transformer can be used with two different supply voltages the transformer portion O' is provided with two primary windings $S_1$ and $S_2$ and a secondary winding $S_6$, whereas portion P' is provided with three primary windings $S_3$, $S_4$, and $S_5$ and a secondary winding $S_7$. A terminal block 6 is provided for making the necessary connections between the primary windings for different supply voltages. For this purpose the block 6 is provided with six terminals U, V, W, X, Y and Z; the terminals U, V and W being connected to a suitable supply of three-phase voltage, and the terminals X, Y and Z being connected to contacts of a switching device 4'.

The switch 4' is similar in design and function to the switch 4 of Fig. 1, and in its right-hand position, as shown, makes the necessary primary connections for D. C. welding, whereas in its left-hand position makes the necessary primary connections for A. C. welding.

The secondary connections are similar to those described in connection with Fig. 1; a switch 5'—similar to switch 5 in Fig. 1—in its left-hand position as shown, making the secondary connections for D. C. welding, whereas in its right-hand position making secondary connections for A. C. welding.

For D. C. welding the apparatus has the position shown, and the transformer 60' is connected for three-phase operation. Primary winding $S_1$ and $S_3$ are series-connected between the terminals U and Y; windings $S_2$ and $S_4$ are series-connected between the terminals W and Z, and winding $S_5$ is connected between terminals V and X.

As stated, the transformer is suitable for operation on two different supply voltages; the primary windings $S_1$, $S_2$, $S_3$, $S_4$ and $S_5$ being star-connected for the higher supply voltage, and being delta-connected for the lower supply voltage. Thus, when using a high supply voltage during D. C. operation the primary windings are connected in star by interconnecting terminals X, Y and Z, whereas with a low supply voltage they are connected in delta-connection by connecting the terminals U—Z; X—W; and V—Y.

When changing over from D. C. to A. C. operation the switch 4' is placed in its left-hand position and switch 5' is placed in its right-hand position. With the switch 4' in its left-hand position, windings $S_1$, $S_3$, and $S_4$ are connected in series between terminals U and V, and windings $S_2$ and $S_4$ are also connected in series between the terminals U and V, in which case the transformer acts as a single-phase transformer. Under these voltage conditions, the secondary windings $S_6$ and $S_7$, which were 90° out of phase during the D. C. welding, will be in phase during the A. C. welding. As windings $S_6$ and $S_7$ have the same number of turns, equal voltages are induced therein and they can be connected in parallel between A. C. welding terminals 135 and 136 by means of the switch 5'. This arrangement has the advantage that all the windings are utilized during A. C. welding, and thus the copper of the transformer is utilized as economically as possible.

As the secondary alternating voltage will not be exactly equal to that in the case of D. C. operation, the primary windings $S_3$ and $S_5$ should preferably be provided with taps, as shown in Figs. 3 and 4, in which the numerals placed near the windings of Fig. 3 indicate the voltage induced therein with a supply of voltage of 380 volts.

The arrangement of the primary windings for A. C. and D. C. welding with two different supply voltages is shown in Figs. 3, 4, 5, and 6, which also show two additional windings $S_{10}$ and $S_{11}$, which are disposed on the core of the transformer and which serve to make the apparatus suitable for use on two different supply voltages also in A. C. welding.

Figures 3, 4:
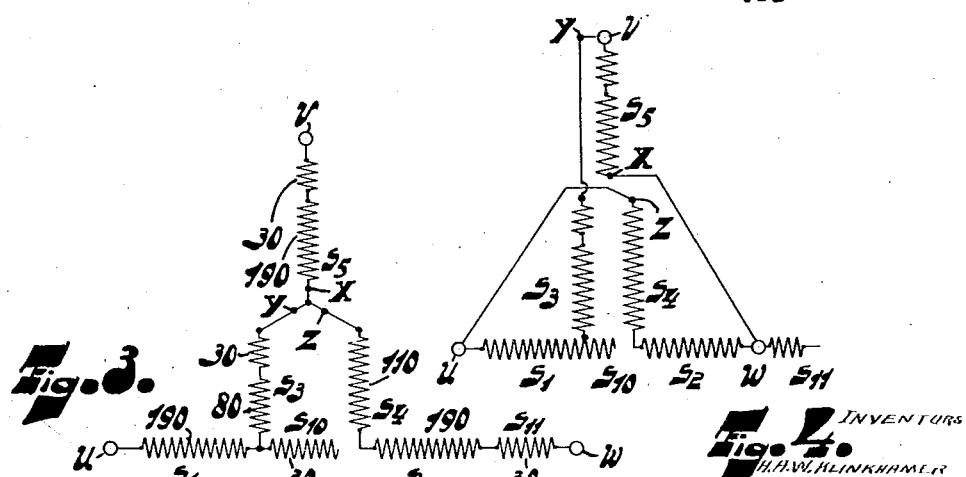
Figs. 3 and 4 are diagrams illustrating the connections of the primary windings of Fig. 2 for D. C. welding at different supply voltages.

In Figs. 3 and 4 the windings are arranged for D. C. welding; in Fig. 3 the windings being star-connected for a high voltage, for instance 380 volts, whereas in Fig. 4 the windings are arranged in delta connection for a lower supply voltage of 220 volts. In Fig. 4 neither winding $S_{10}$ nor $S_{11}$ is in circuit, whereas in Fig. 3 only winding $S_{11}$ is in circuit.

Figures 5, 6:
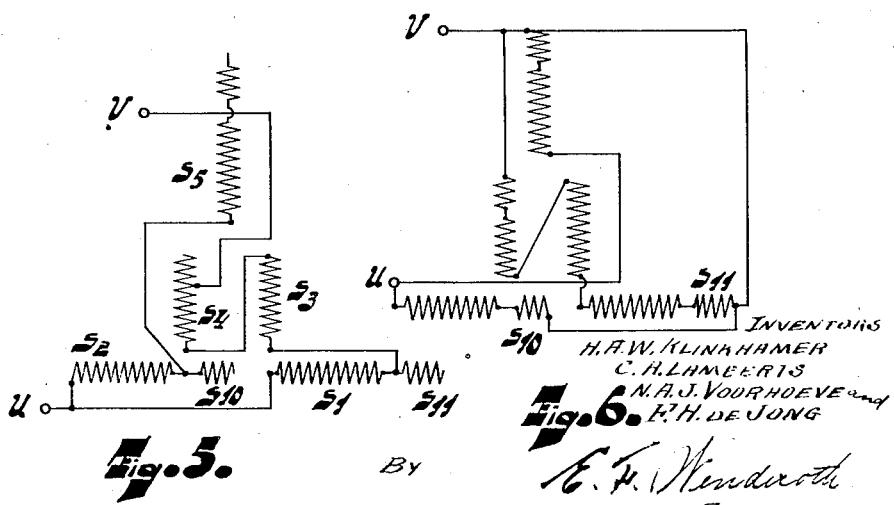
Figs. 5 and 6 are diagrams showing the connections of the primary windings of the transformer of Fig. 2 for A. C. welding at different supply voltages.

In Figs. 5 and 6 the primary windings are arranged for A. C. welding; in Fig. 5 the windings being arranged for the higher supply voltage, and in Fig. 6 for the lower supply voltage. In both Figs. 5 and 6 the windings are connected across a single phase of the supply, and in Fig. 6 both windings $S_{10}$ and $S_{11}$ are in circuit.

Instead of using change-over devices of the type of switches 5 and 6, other devices may be used, for instance, suitable plugs or terminals. It is, however, preferable that the plugs be used on the primary side where the currents have the lowest intensity, whereas the terminals be used on the secondary side.

Figure 7:
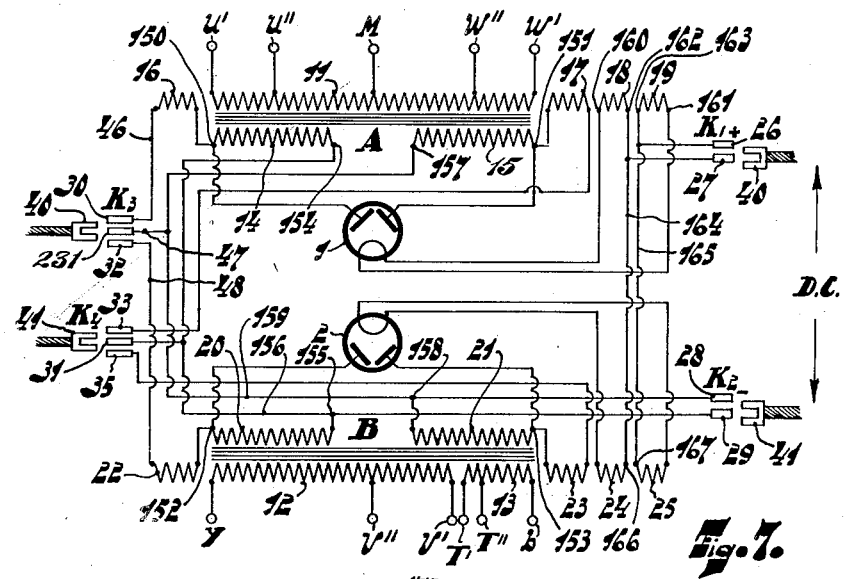
Fig. 7 is a schematic diagram of a welding apparatus according to still another embodiment of the invention.

The welding apparatus shown in Fig. 7 comprises two separate single-phase transformers A and B; however they may form, as in Figs. 1 and 2, a single transformer; preferably a leakage transformer whose primary and secondary windings are separated from each other by adjustable magnetic bridge pieces.

The transformer A is provided with a primary winding 11 having its ends connected to terminals U' and W', two main secondary windings 14 and 15, two auxiliary secondary windings 16 and 17, and two heating-current windings 18 and 19. In a similar manner transformer B is provided with a primary winding 12 having its ends connected to terminals Y and V', two main secondary windings 20 and 21, two auxiliary secondary windings 22 and 23, and two heating current windings 24 and 25.

In D. C. welding the primary windings of transformer A and B are connected in the Scott arrangement and for this purpose winding 11 is provided with a central tap connected to a terminal M, and the ratio between the number of turns of winding 12 and winding 11 is $$1 : \tfrac{1}{2}\sqrt{3}.$$

The winding 13 which is not used in D. C. welding, has a number of turns equal to the difference between the number of turns of winding 11 and of winding 12.

For using the transformers with different supply voltages, winding 11 is provided with two taps symmetrically arranged on each side of the tap M and connected to terminals U'' and W'', whereas winding 12 has a tap connected to a terminal V'', and winding 13 has a tap connected to a terminal T''.

The auxiliary windings 16, 17, 22 and 23 serve to increase the amount of current furnished by the transformer during A. C. welding, and are not in use during D. C. welding. The windings 16 and 17, and 22 and 23 are located close to the primary windings 11 and 12 respectively in order that a substantially constant voltage will be induced therein.

The apparatus is provided with four plug-type connectors $K_1$, $K_2$, $K_3$, and $K_4$ adapted to receive U-shaped plugs 40 and 41 connected to the welding cables. The connectors $K_1$ and $K_2$ are used for connecting the cables for D. C. welding and each consists of two connecting strips 26 and 27, and 28 and 29, whereas the connectors $K_3$ and $K_4$ are used for A. C. welding and each consists of three terminal strips 30, 231, 32, and 33, 31 and 35. A more detailed description of a suitable connector will be given in connection with Fig. 9.

The main secondary windings 14 and 15 are connected in the following manner: The outer end 150 of winding 14 is connected to one of the anodes of tube 1, and through the auxiliary winding 16 to the strip 30, whereas the outer end 151 of winding 15 is connected to the other anode of tube 1, and through the auxiliary winding 17 to the strip 33.

Similarly the main secondary winding 20 has its outer end 152 connected to one anode of tube 2, and through auxiliary winding 22 to the strip 32, whereas winding 21 has its outer end 153 connected to the other anode of tube 2, and through auxiliary winding 23 to the strip 35.

The inner ends 154 and 155 of windings 14 and 20 respectively, are connected through a conductor 156 to the strips 29 and 31, whereas the inner ends 157 and 158 of windings 15 and 21 respectively, are connected through a conductor 159 to the strips 231 and 28.

The heating-current windings 18 and 19 have their ends 160 and 161 connected to the ends of the cathode of tube 1, whereas their ends 162 and 163 are connected through conductors 164 and 165 respectively to the strips 26 and 27, and also to the ends 166 and 167 of heating-current windings 24 and 25 whose free ends are connected to the cathode of tube 2. Thus it is seen that when the plug 40 is not inserted in the connector $K_1$, the voltages induced in windings 18 and 19 block the voltage induced in windings 24 and 25, with the result that no heating current is supplied to the cathodes of tubes 1 and 2. However, when the plug is inserted, windings 18 and 19 are placed in series across the cathode of tube 1, whereas windings 24 and 25 are placed in series across the cathode of tube 2.

Figure 8:
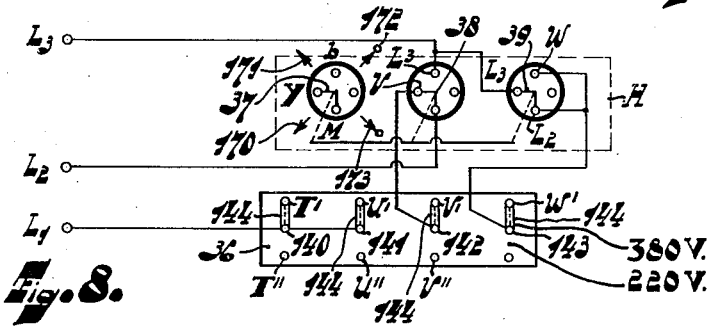
Fig. 8 is a schematic diagram of a switching arrangement for connecting the primary windings of Fig. 7 to the supply mains.

The necessary connections of the windings for A. C. and D. C. operation and for two different supply voltages is accomplished by means of the arrangement schematically shown in Fig. 8, in which $L_1$, $L_2$, and $L_3$ are the terminals of the 3-phase supply, 36 is a terminal block serving to make the connections for the different supply voltages, and H is a switching device for connecting the windings for A. C. or D. C. welding.

The terminal block 36 is provided with a central row of four terminals 140, 141, 142 and 143 and an upper and lower row of four terminals each; the terminals of the upper and lower rows being marked with letters corresponding to the terminals of Fig. 7. For the higher supply voltages for instance 380 volts, the corresponding terminals of the central and upper rows are connected by means of suitable removable connecting strips 144, whereas for the lower supply voltage, for instance 220 v., the strips 144 are changed over to connect the corresponding terminals of the central and lower rows.

The switching device H comprises a rotary switch having three L-shaped contact arms 37, 38, and 39 insulated from each other and interlocked so as to rotate together, for instance by being fixedly secured to a common shaft. As indicated by the arrows, the arms have four positions; a D. C. position 170, an A. C. position 171, and two neutral or inactive positions 172 and 173. Each arm cooperates with four stationary contacts indicated by reference letters corresponding to the terminals of Fig. 7 and to the supply terminals $L_2$ and $L_3$.

When the apparatus is being used for D. C. welding, the switching device H is in the position shown, and the necessary connections are made between the windings whereby the secondary windings of Fig. 7 form a symmetrical four-phase system. The plugs 40 and 41 are connected to the connectors $K_1$ and $K_2$ respectively, whereby plug 40 connects strips 26 and 27 and plug 41 connects strips 28 and 29.

The connection of strips 26 and 27 causes the cathodes to be energized in the manner described above.

On the other hand, when strips 28 and 29 are connected the neutral point of the four-phase system is formed. More particularly, conductor 159 is connected to conductor 156, thereby interconnecting the ends 154, 157, 155, and 158 of windings 14, 15, 20 and 21 respectively.

When using the apparatus for A. C. welding, the switching device H is rotated into position 171 whereby the winding 13 is connected in series with the primary winding 12 as a result of which the total number of turns of the primary windings of transformer B is equal to that of transformer A. Also the series connection of windings 12 and 13 are placed in parallel with windings 11, and this parallel arrangement connected across the terminals $L_1$ and $L_2$; thus to a single phase.

The plugs 40 and 41 are inserted in the connectors $K_3$ and $K_4$ respectively, whereby the secondary windings are connected in parallel in the following manner: windings 16 and 14 are connected in series between strips 30 and 31; windings 15 and 17 are connected in series between strips 231 and 33; windings 20 and 22 are connected in series between strips 32 and 31; and windings 21 and 23 are connected in series between strips 231 and 35. Thus it is seen that plugs 40 and 41 in addition to making the connection for the welding current, also act as switching members both during the A. C. and D. C. welding.

Figure 9:
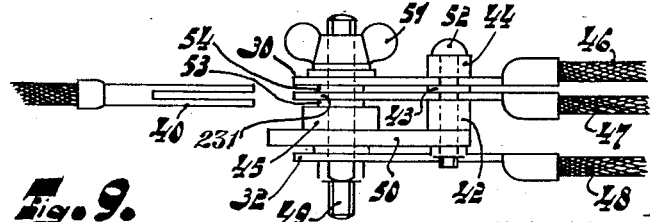
Fig. 9 is a side view of a plug-type connector suitable for use in the welding apparatus shown in Fig. 7.

A suitable construction for the connectors $K_1$, $K_2$, $K_3$ and $K_4$ is shown in detail in Fig. 9. The connector shown corresponds to the connector $K_3$ and comprises a plate 50 of insulating material and three strips 30, 231, and 32 connected to the secondary windings by cables 46, 47 and 48 respectively. The strips 30 and 231 are supported from the plate 50 by means of a bolt 52, and are insulated from each other and from the bolt 52 by means of insulating members 42, 43, and 44. Passing through a clearance hole near the end of plate 50 and through clearance holes in the strips 30 and 231 is a bolt 49 to which is secured a ring 45 of conductive material. The strip 32 is mechanically secured and electrically connected to the bolt 49 and this is electrically connected to the ring 45, whereas strips 30 and 231 are insulated from bolt 49 and from each other by means of insulating bushings 53 and 54.

The U-shaped plug 40 connected to a welding cable is inserted into the connector with one fork between strips 30 and 231, and the other between strip 231 and the ring 45 connected to the strip 32. The connection can then be rigidly secured together with a wing nut 51.

The terminals $K_1$ and $K_2$ may be constructed in a similar manner by omitting either strip 30 or 31. The same plug 40 is used for both types of connectors.

Such a connector, which can also be used in the apparatus shown in Figs. 1 to 6, is very simple in construction and can be readily manipulated. Furthermore, with the use of such connectors faulty connections which might cause short circuiting or damage the rectifying tubes, are impossible.

While we have described our invention in connection with specific examples and in specific applications, we do not wish to be limited thereto, but desire the appended claims to be construed as broadly as permissible in view of the prior art.

What we claim is:

1. A welding apparatus for supplying A. C. and D. C. welding current from a polyphase alternating-current supply comprising, a transformer formed of a plurality of single-phase transformer portions having primary windings and secondary windings, at least one auxiliary winding on said transformer, rectifiers for changing into D. C. current the current supplied by said secondary windings, and switching means for changing the apparatus over to A. C. operation during which the welding current is taken directly from the secondary windings, said means in its A. C. position connecting the transformer in single phase and connecting at least a portion of the primary windings in parallel and at least a portion of the secondary windings in parallel, said means in its A. C. position also connecting said auxiliary winding in series with one of the other windings.

2. A welding apparatus for supplying A. C. or D. C. welding current from a polyphase alternating-current supply comprising, a transformer having two cores, primary windings and secondary windings on each of said cores, at least one auxiliary winding disposed on one of said cores near the primary windings, rectifiers for changing into D. C. welding current the current supplied by said secondary windings, and switching means for changing the apparatus over to A. C. operation during which the welding current is taken directly from the secondary windings, said means in its A. C. position connecting the transformer in single phase and connecting at least a portion of said primary windings in parallel and at least a portion of the secondary windings in parallel, said means in its A. C. position also connecting said auxiliary winding in series with the secondary windings.

3. A welding apparatus for supplying A. C. and D. C. welding current from a polyphase alternating-current supply comprising, a transformer formed of two single-phase transformer portions having primary windings and secondary windings arranged in the Scott connection, rectifiers for changing into D. C. welding current the current supplied by said secondary windings, and switching means for changing the apparatus over to A. C. operation during which the welding current is taken directly from the secondary windings, said means in its A. C. position connecting the transformer in single-phase and connecting at least a portion of the primary windings in parallel and at least a portion of the secondary windings in parallel.

4. A welding apparatus for supplying A. C. and D. C. welding current from a polyphase alternating-current supply comprising, a single-phase transformer having two primary windings and a secondary winding, a second single-phase transformer having three primary windings and a secondary winding, the number of turns of said primary windings having the ratio of $\sqrt{3}:\sqrt{3}:1:1:2$ in accordance with the Scott connection, rectifiers for changing into D. C. current the current supplied by said secondary windings, and switching means for changing the apparatus over to A. C. operation during which the welding current is supplied directly from the secondary windings, said means in its A. C. position connecting said primary windings in two parallel-connected circuits, one circuit comprising the series connection of the first, third, and at least part of the fourth winding, and the second circuit comprising the series connection of the second and at least part of the fifth winding.

5. A welding apparatus for supplying A. C. and D. C. welding current from a polyphase alternating-current supply comprising, a transformer formed of a plurality of single-phase transformer portions having primary windings and secondary windings, rectifiers for changing into D. C. welding current the current supplied by said secondary windings, switching means including a plurality of connecting terminals and cooperating plugs for changing the apparatus over to A. C. operation during which the welding current is supplied directly from the secondary windings, said means in its A. C. position connecting at least a portion of the primary windings in parallel and at least a portion of the secondary windings in parallel, said terminals comprising a plurality of mutually-insulated conductive members connected to the ends of said secondary windings, a welding cable connected to each of said plugs, said plugs when connected to said terminals also interconnecting the ends of the secondary windings.

6. A welding apparatus for supplying A. C. or D. C. welding current from a polyphase alternating-current supply comprising, a transformer formed of a plurality of single-phase transformer portions having primary windings and secondary windings, rectifiers for changing into D. C. welding current the current supplied by said secondary windings, and switching means including a plurality of connecting terminals and cooperating plugs for changing the apparatus over to A. C. operation during which the welding current is supplied directly from the secondary windings, said means in its A. C. position connecting at least some of the primary windings in parallel and at least some of the secondary windings in parallel, each of said terminals comprising a plurality of resilient strips of conductive material, means securing said strips together, and means for insulating said strips from each other, said strips being connected to the ends of said secondary windings, and a welding cable connected to each of said plugs, said plugs when inserted into said terminals electrically connecting the strips together and to the welding cable connected thereto.

HENDRIK ABRAHAM
    WIJNAND KLINKHAMER.
CLAMOR AUGUST LAMBERTS.
NICOLAAS ANTHONY
    JOHANNES VOORHOEVE.
FRANS HENDRIK DE JONG.